United States Patent
Ikeda et al.

(10) Patent No.: US 9,327,767 B2
(45) Date of Patent: May 3, 2016

(54) STRUCTURE AGAINST SIDE IMPACT

(71) Applicant: Nissan Motor Co., Ltd., Kanagawa (JP)

(72) Inventors: Taiji Ikeda, Kanagawa (JP); Tatsuzo Tomita, Kanagawa (JP); Masato Sakurai, Kanagawa (JP); Toshiya Sagara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/397,018

(22) PCT Filed: Apr. 15, 2013

(86) PCT No.: PCT/JP2013/061199
§ 371 (c)(1),
(2) Date: Oct. 24, 2014

(87) PCT Pub. No.: WO2013/161612
PCT Pub. Date: Oct. 31, 2013

(65) Prior Publication Data
US 2015/0108788 A1    Apr. 23, 2015

(30) Foreign Application Priority Data

Apr. 27, 2012  (JP) ................................. 2012-102924

(51) Int. Cl.
*B60N 2/42*    (2006.01)
*B62D 21/15*   (2006.01)
(Continued)

(52) U.S. Cl.
CPC ............ *B62D 21/157* (2013.01); *B60N 2/4235* (2013.01); *B60N 2/68* (2013.01); *B62D 25/04* (2013.01); *B62D 25/2036* (2013.01)

(58) Field of Classification Search
CPC .......... B60N 2/06; B60N 2/42; B60N 2/4235; B60N 2/427; B60N 2/42727; B60N 2/42736; B60N 2/42745; B60N 2/68; B60R 21/02; B62D 25/04
See application file for complete search history.

(56) References Cited

U.S. PATENT DOCUMENTS 4,512,604 A * 4/1985 Maeda et al. ................. 296/68.1
5,000,509 A * 3/1991 Sinnhuber et al. ........ 296/187.12
(Continued)

FOREIGN PATENT DOCUMENTS

DE         19521888 A1 * 11/1996  ............. B60R 21/02
DE     102013017269 A1 *  8/2014  ............. B62D 25/04
(Continued)

OTHER PUBLICATIONS

International Search Report issued in PCT/JP2013/061199 mailed on May 28, 2013 (2 pages).
(Continued)

*Primary Examiner* — Glenn Dayoan
*Assistant Examiner* — Paul Chenevert
(74) *Attorney, Agent, or Firm* — Osha Liang LLP

(57) ABSTRACT

A structure against a side impact has a side wall of a vehicle body, the side wall including a pillar within which a reinforcement is provided, a seatback frame, and a load receiving member disposed on the seatback frame to contact with the side wall of the vehicle body and to receive an impact load when the side wall of the vehicle body is moved toward a vehicle cabin by a side impact. A high-strength area reinforced by the reinforcement to have high strength is formed in the side wall of the vehicle body. An upper area of the pillar reinforced by the reinforcement includes a lower area having a strength lower than the strength of the high-strength area is formed beneath the high-strength area. A lower area that is not reinforced by the reinforcement is formed beneath the upper area.

3 Claims, 3 Drawing Sheets

(51) Int. Cl.
*B60N 2/68* (2006.01)
*B62D 25/20* (2006.01)
*B62D 25/04* (2006.01)

(56) References Cited

U.S. PATENT DOCUMENTS

| | | | |
|---|---|---|---|
| 5,407,244 A * | 4/1995 | Nakano et al. | 296/68.1 |
| 5,435,618 A * | 7/1995 | Sacco et al. | 296/187.12 |
| 5,584,525 A * | 12/1996 | Nakano et al. | 296/68.1 |
| 5,671,968 A * | 9/1997 | Masuda et al. | 296/187.12 |
| 5,984,402 A * | 11/1999 | Takeuchi | 296/187.12 |
| 6,073,992 A * | 6/2000 | Yamauchi et al. | 296/203.01 |
| 6,237,991 B1 * | 5/2001 | Weber | 296/187.12 |
| 6,279,990 B1 * | 8/2001 | Miyasaka et al. | 296/203.03 |
| 6,299,238 B1 * | 10/2001 | Takagi et al. | 296/187.12 |
| 6,299,239 B1 * | 10/2001 | Sagawa et al. | 296/187.12 |
| 6,332,643 B1 * | 12/2001 | Sukegawa et al. | 296/203.03 |
| 6,450,574 B1 * | 9/2002 | Umezawa et al. | 297/216.13 |
| 6,474,726 B1 * | 11/2002 | Hanakawa et al. | 296/191 |
| 6,761,402 B1 * | 7/2004 | Muraishi | 297/216.1 |
| 7,246,845 B2 * | 7/2007 | Rashidy et al. | 296/187.12 |
| 7,854,470 B2 * | 12/2010 | Yamaki et al. | 296/187.12 |
| 7,857,377 B2 * | 12/2010 | Chen et al. | 296/203.03 |
| 8,033,602 B2 * | 10/2011 | Yamaki et al. | 297/216.13 |
| 8,038,201 B2 * | 10/2011 | Torii | 296/187.12 |
| 8,061,763 B2 * | 11/2011 | Melz et al. | 296/187.03 |
| 8,079,635 B2 * | 12/2011 | DeVor et al. | 296/187.08 |
| 8,226,156 B2 * | 7/2012 | Shiono et al. | 296/193.02 |
| 8,419,113 B2 * | 4/2013 | Kunishi et al. | 296/193.06 |
| 8,602,492 B2 * | 12/2013 | Nakaya et al. | 297/216.13 |
| 8,668,225 B2 * | 3/2014 | Yamaki et al. | 280/730.2 |
| 8,827,362 B2 * | 9/2014 | Yamaki et al. | 297/216.13 |
| 8,851,556 B2 * | 10/2014 | Nishimura et al. | 296/193.06 |
| 8,911,004 B2 * | 12/2014 | Yao | 296/193.06 |
| 9,010,855 B2 * | 4/2015 | Yamaki et al. | 297/216.13 |
| 2001/0004161 A1 * | 6/2001 | Son | 296/203.03 |
| 2005/0023862 A1 * | 2/2005 | Saeki | 296/187.12 |
| 2005/0151363 A1 * | 7/2005 | Saeki | 280/784 |
| 2006/0038428 A1 * | 2/2006 | Song | 296/187.12 |
| 2006/0202513 A1 * | 9/2006 | Matsuda | 296/187.12 |
| 2006/0208537 A1 * | 9/2006 | Dingman et al. | 296/193.05 |
| 2008/0036235 A1 * | 2/2008 | Ameloot et al. | 296/102 |
| 2009/0021061 A1 | 1/2009 | Yamaki et al. | |
| 2009/0250967 A1 * | 10/2009 | Bodin | 296/187.01 |
| 2010/0038928 A1 * | 2/2010 | Onuma | 296/187.12 |
| 2011/0127802 A1 * | 6/2011 | Kim et al. | 296/203.03 |
| 2011/0133515 A1 * | 6/2011 | Mori | 296/193.06 |
| 2011/0193378 A1 * | 8/2011 | Kalinowski | 297/216.13 |
| 2011/0241384 A1 * | 10/2011 | Mori | 296/193.06 |
| 2011/0298267 A1 * | 12/2011 | Yamaki et al. | 297/391 |
| 2012/0193954 A1 * | 8/2012 | Sakkinen et al. | 297/216.13 |
| 2013/0187409 A1 * | 7/2013 | Moll | 296/193.06 |
| 2015/0028627 A1 * | 1/2015 | Fellague | 296/187.13 |

FOREIGN PATENT DOCUMENTS

| | | | | |
|---|---|---|---|---|
| EP | 0753450 A1 * | 1/1997 | | B62D 21/15 |
| EP | 0953495 A2 * | 11/1999 | | B62D 25/04 |
| EP | 1170197 A2 * | 1/2002 | | B62D 25/04 |
| EP | 1231130 A1 * | 8/2002 | | B62D 25/04 |
| EP | 1247724 A2 * | 10/2002 | | B62D 25/04 |
| EP | 2420432 A1 * | 2/2012 | | B62D 25/06 |
| FR | 2979608 A1 * | 3/2013 | | B62D 21/15 |
| JP | 2617077 B2 * | 6/1997 | | B60N 2/22 |
| JP | 2000-085620 A | 3/2000 | | |
| JP | 2009006894 A * | 1/2009 | | B60N 2/42 |
| JP | 2011-025827 A | 2/2011 | | |
| SE | 201200459 A1 * | 4/2013 | | B62D 25/04 |
| WO | WO 2008037350 A1 * | 4/2008 | | B62D 21/15 |
| WO | WO 2008061931 A1 * | 5/2008 | | B62D 25/04 |
| WO | WO 2011151962 A1 * | 12/2011 | | B62D 25/04 |
| WO | WO 2012035662 A1 * | 3/2012 | | B62D 25/04 |

OTHER PUBLICATIONS

Written Opinion of the International Searching Authority issued in PCT/JP2013/061199 mailed on May 28, 2013 (4 pages).
International Preliminary Report on Patentability from PCT/JP2013/061199 issued on Aug. 29, 2013 (6 pages).

* cited by examiner

STRUCTURE AGAINST SIDE IMPACT

CROSS-REFERENCE TO RELATED APPLICATIONS

This application claims priority to Japanese Patent Application 2012-102924, filed on Apr. 27, 2012, and is a national phase application of PCT Patent Application No. PCT/JP2013/061199, filed Apr. 15, 2013, the contents of which are incorporated by reference to the present application in their entirety.

BACKGROUND

1. Technical Field

The present invention relates to a structure against a side impact by which an impact load to which a vehicle body is subjected from its side is received by a load receiving member disposed on a seatback frame.

2. Related Art

Known is a structure against a side impact by which an impact load due to a side impact to a vehicle is received by a load receiving member disposed on a seatback frame. Japanese Unexamined Patent Publication No. 2011-25827 discloses a structure against a side impact like this. In the load transfer structure, when a side wall of a vehicle body receives an impact load and is moved to an inside of a vehicle cabin, the impact load is transferred (distributed) from a load receiving member to an opposite-side side wall of the vehicle body through a center tunnel, and absorbed by an entire of the vehicle body.

SUMMARY OF INVENTION

However, in the above structure against a side impact, consideration is not given to an intrusion mode of the side wall of the vehicle body to the inside of the vehicle cabin, and thereby further improvements are desired.

One or more embodiments of the present invention provides a structure against a side impact that can suppress intrusion of a side wall of a vehicle body in consideration of an intrusion mode of the side wall of the vehicle body to an inside of a vehicle.

An aspect of the present invention provides a structure against a side impact, the structure comprising: a side wall of a vehicle body; a seatback frame; and a load receiving member disposed on the seatback frame to contact with the side wall of the vehicle body and to receive an impact load when the side wall of the vehicle body is moved toward a vehicle cabin by a side impact, wherein strength of an upper area of the side wall of the vehicle body is made higher than strength of a lower area of the side wall of the vehicle body, and an upper end of the upper area is located lateral to the load receiving member.

DETAILED DESCRIPTION

Figure 1:
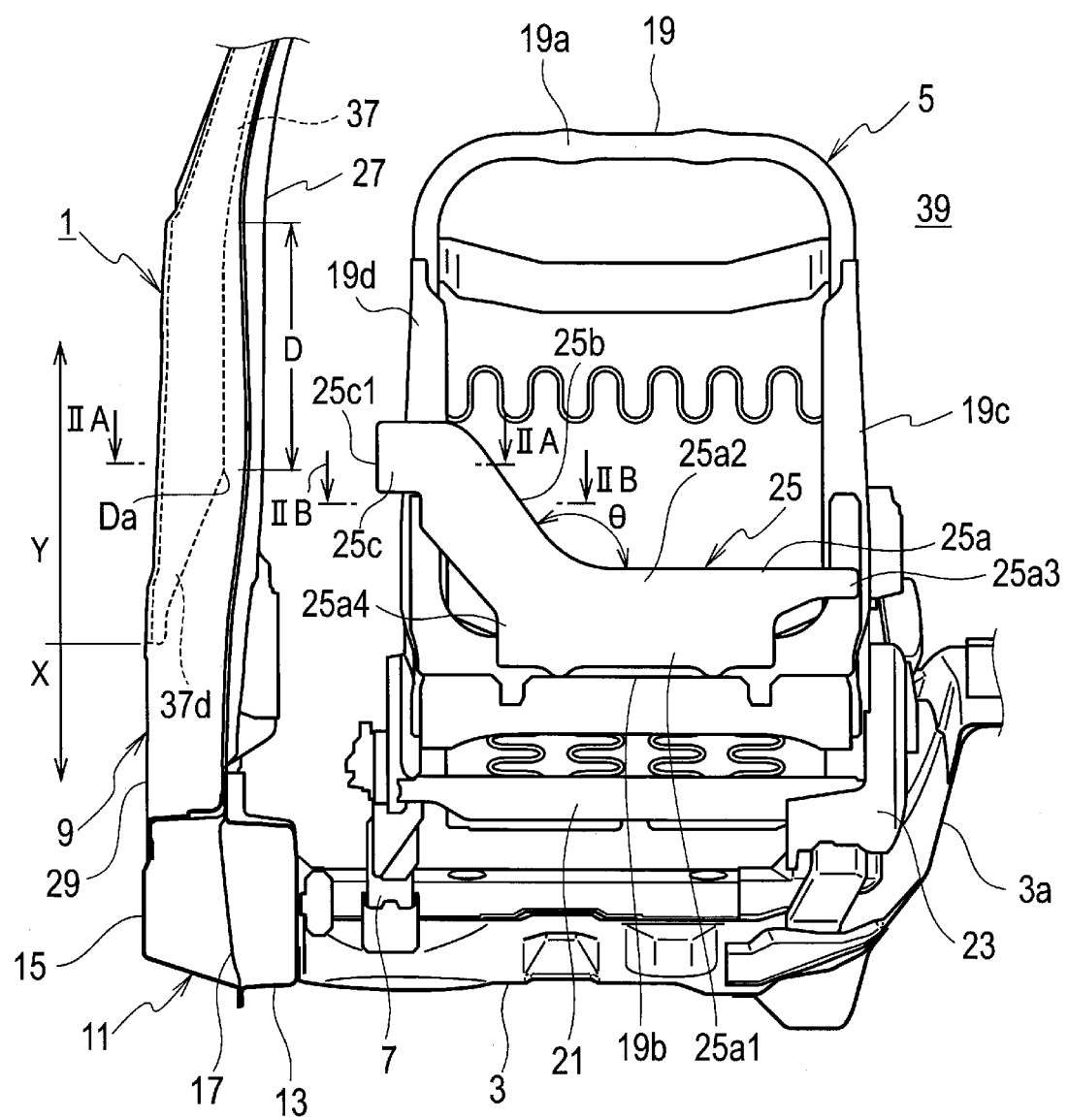
FIG. 1 is a rear view of a left half of a vehicle body including a structure against a side impact according to an embodiment (the vehicle body is shown as a cross-sectional view).
Figure 2:
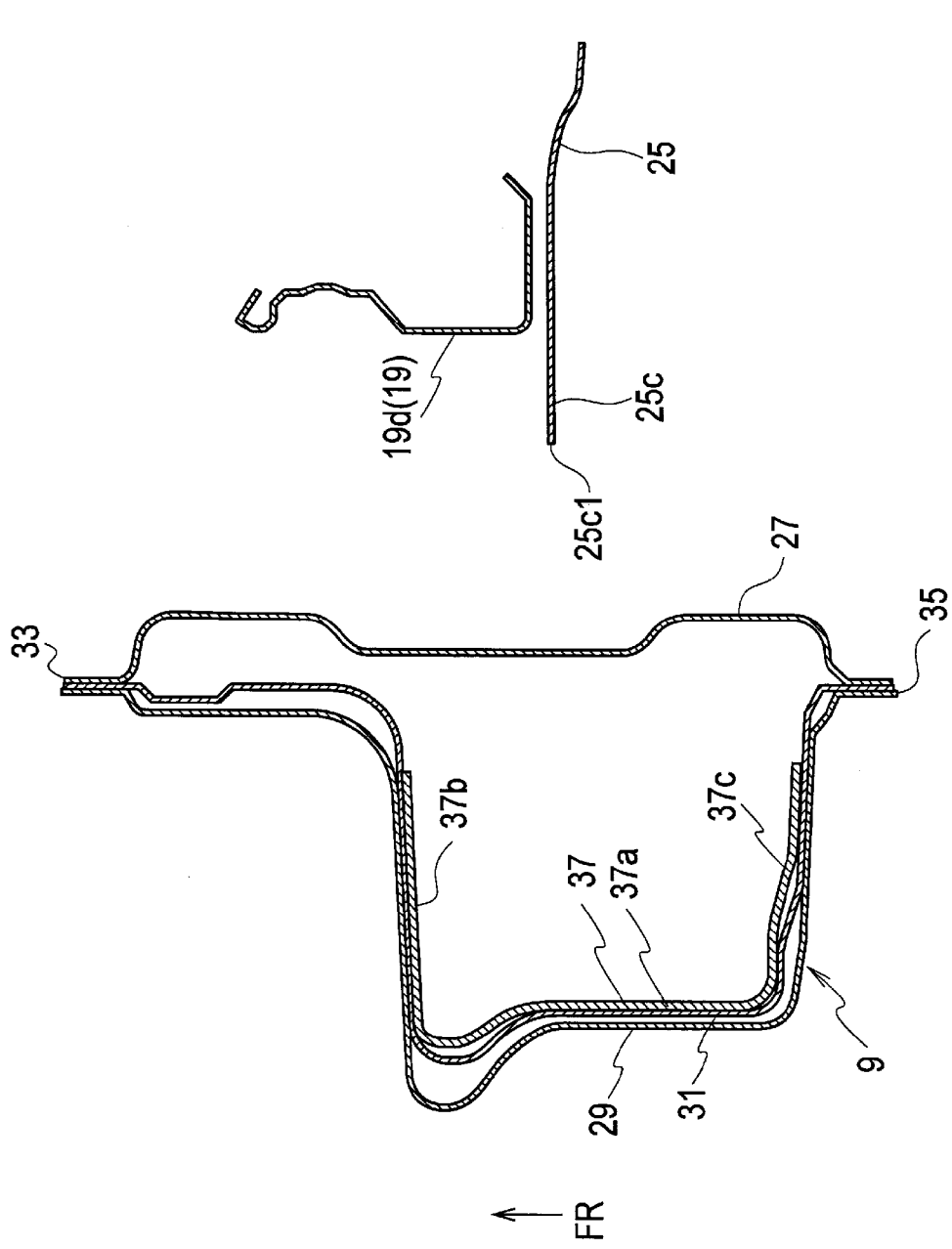
FIG. 2A is a cross-sectional view taken along a line IIA-IIA in FIG. 1.
FIG. 2B is a cross-sectional view taken along a line IIB-IIB in FIG. 1.
Figure 3:
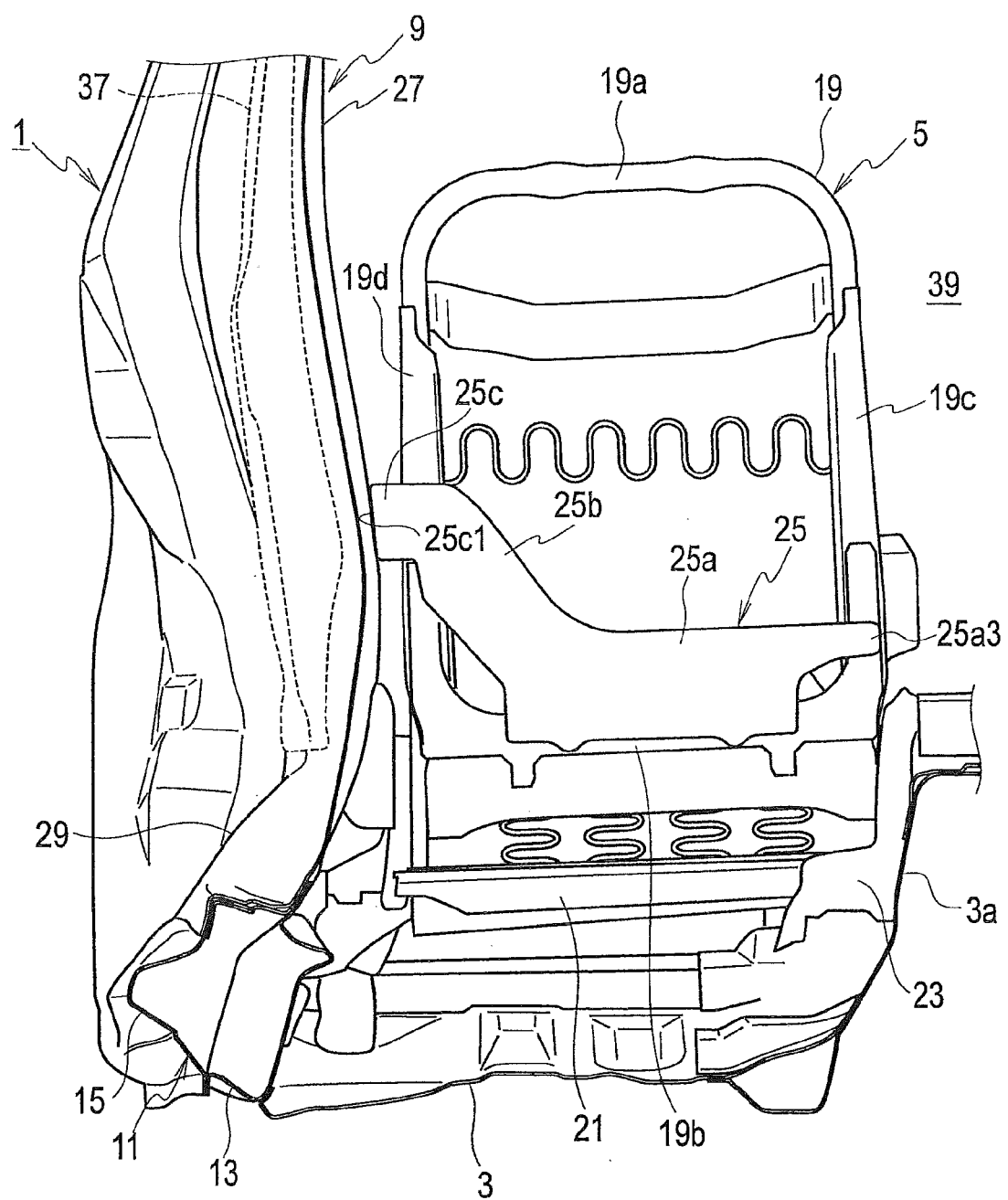
FIG. 3 is a rear view of the vehicle body at a side impact.

Hereinafter, embodiments of the present invention will be explained based on the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that only a left side of a vehicle body is shown in FIGS. 1 to 3 and following explanations will be made with respect to only the left side of the vehicle body. However, a right side of the vehicle body has the same structure symmetrically.

As shown in FIG. 1, a seat 5 is mounted on a floor panel 3 of a vehicle body 1 by interposing a seat slide mechanism 7 therebetween. The seat 5 can slide backward and forward on the seat slide mechanism 7. A center pillar 9 that is a part of a side wall of the vehicle body 1 is extended vertically on a laterally outer side of the seat 5 (left side in FIG. 1). There is a front door on a front side of the center pillar 9, and there is a rear door or a side panel on a rear side of the center pillar 9.

A side sill 11 is joined with a side edge of the floor panel 3, and the center pillar 9 is extended upward from an upper face of the side sill 11. The side sill 11 includes an inner sill 13, an outer sill 15, and a reinforcement 17. The reinforcement 17 is fixed between the inner sill 13 and the outer sill 15. A center tunnel 3a bulging upward is formed at a center portion of a floor on a laterally inner side of the floor panel 3 (right side in FIG. 1).

The seat 5 is shown by only its frame members, and its fabric materials and cushion materials are not shown. The seat 5 includes a seatback frame 19, and a seat cushion frame 21. The seatback frame 19 can swing backward and forward relative to the seat cushion frame 21 by a reclining mechanism 23. The seat back frame 19 includes an upper lateral member 19a, a lower lateral member 19b, an innter vertical member 19c, and an outer vertical member 19d.

A load transfer member 25 served as a load receiving member is attached to a lower rear portion of the seatback frame 19. The load transfer member 25 includes a horizontal portion 25a extending laterally, and an inclined portion 25b extended obliquely outward and upward from an outer end of the horizontal portion 25a.

The horizontal portion 25a has an almost constant vertical width along its extending direction (lateral direction). On the other hand, the inclined portion 25b has an almost constant width along its extending direction (oblique direction). An angle θ between the horizontal portion 25a and the inclined portion 25b is made obtuse.

The load transfer member 25 is made up of a planar member. The planar member may be a flat panel, but may be a wavy panel on whose surface embosses or ribs are formed.

The horizontal portion 25a is fixed with the seatback frame 19 by overlapping its lower edge 25a1 on the lower lateral member 19b and overlapping its protruded end 25a3 protruded laterally inward from its upper edge 25a2 on a lower portion of the inner vertical member 19c.

A side edge of the laterally outer end 25a4 of the horizontal portion 25a is located on a laterally inner side from the outer vertical member 19d of the seatback frame 19, and the side edge of the laterally outer end 25a4 is extended to a lower edge of the inclined portion 25b. An upper end of the inclined portion 25b is continued to an upper-end horizontal portion 25c that is extended laterally outward slightly beneath a vertical center of the outer vertical member 19d of the seatback frame 19. The upper-end horizontal portion 25c is overlapped on the outer vertical member 19d of the seatback frame 19, and is not in contact with the outer vertical member 19d at a position of a cross-sectional view shown in FIG. 2A taken along a line IIA-IIA shown in FIG. 1. However, the load transfer member 25 is fixed with the seatback frame 19 (the outer vertical member 19d) at a position of a cross-sectional view shown in FIG. 2B taken along a line IIB-IIB shown in FIG. 1.

The upper-end horizontal portion 25c is protruded laterally outward from the outer vertical member 19d of the seatback frame 19. A constant distance is made between an end edge 25c1 of the protruded upper-end horizontal portion 25c and the center pillar 9.

In FIG. 1 and FIGS. 2A-2B, a reclining position of a seatback of the seat 5 is adjusted according to a seating position of an occupant (not shown). With this reclining position, the upper-end horizontal portion 25c of the load transfer member 25 is located just beside the center pillar 9.

As shown in a cross-sectional plan view in FIGS. 2A-2B, the center pillar 9 has an inner pillar 27 located just beside the upper-end horizontal portion 25c (in the above-mentioned reclining position), and an outer pillar 29 located on an outer side. An outer reinforcement 31 is disposed along an inner surface of the outer pillar 29. Front and rear edges 33 and 35 of the inner pillar 27, the outer pillar 29 and the outer reinforcement 31 are joined so as to form flanges, and thereby the center pillar 9 forms a closed cross-section.

Further, an inner reinforcement 37 having a shape fitted with a shape of the outer reinforcement 31 is provided on an inner side of the outer reinforcement 31. The inner reinforcement 37 is configured to include a side panel 37a, a front panel 37b bent inward from a front edge of the side panel 37a and a rear panel 37c bent inward from a rear edge of the side panel 37a, and an inner side of the inner reinforcement 37 is opened. Note that an arrow FR shown in FIGS. 2A-2B indicates a front of a vehicle.

In addition, as shown in FIG. 1, the inner reinforcement 37 is not disposed in a lower area X near the side sill 11. Namely, strength of the center pillar 9 reinforced by the inner reinforcement 37 in an upper area Y is made higher than strength of the center pillar 9 not-reinforced by the inner reinforcement 37 in the lower area X.

Then, the upper area Y is located beside the upper-end horizontal portion 25c of the load transfer member 25 attached to the seatback frame 19 (in the above-mentioned reclining position). A vertical strength of the center pillar 9 can be varied by changing a lateral width of at least one of the front panel 37b and the rear panel 37c.

A high-strength area D in which the widths of the front panel 37b and the rear panel 37c are made widest is formed at a middle portion of the upper area Y. A lower end Da of the high-strength area D is located just beside the end edge 25c1 of the upper-end horizontal portion 25c. The end edge 25c1 of the upper-end horizontal portion 25c has a constant width vertically as shown in FIG. 1, and a lower portion of the end edge 25c1 is located just beside the lower end Da.

The lateral widths of the front panel 37b and the rear panel 37c are gradually narrowed beneath the lower end Da (i.e. in the upper area Y), and inner edges of the front panel 37b and the rear panel 37c form inclined edges 37d.

Next, deformations of the vehicle body 1 at a side impact and relations between the load transfer member 25 and the side wall of the vehicle body 1 will be explained.

As shown in FIG. 3, when the vehicle body 1 near the center pillar 9 laterally receives an impact load, a side wall including the center pillar 9 is moved toward a vehicle cabin 39. The center pillar 9 (the side wall) contacts with the load transfer member 25 (the end edge 25c1 of the upper-end horizontal portion 25c) near the lower end Da by this movement.

In the load transfer member 25 according to the present embodiment, when the center pillar (the side wall) receives an impact load and then is moves toward the vehicle cabin 39, the high-strength area D of the center pillar 9 (the high-strength area D of the side wall) contacts with the load transfer member 25 and then is received by the load transfer member 25. As a result, the intrusion of the center pillar 9 toward the vehicle cabin 39 can be suppressed effectively. Note that, also in a case where the load transfer member 25 doesn't contact with the center pillar 9 but contacts with a door or a body in front or behind the center pillar 9, the load transfer member 25 contacts with the high-strength area D of the side wall in front or behind the high-strength area D of the center pillar 9. Since the strength of the high-strength area D of the center pillar 9 is high, the strength of the high-strength area D of the side wall in front or behind the center pillar 9 is also made high.

Note that, since the center pillar 9 is received by the load transfer member 25 in the high-strength area D when the center pillar 9 intrudes into the vehicle cabin 39 as shown in FIG. 3, a portion (that has weaker strength than that of the high-strength area D) near the upper area Y (the inclined edges 37d) beneath the high-strength area D becomes a maximum intrusion position. Note that, since the lower area X (that has weaker strength than that of the upper area Y) is close to the side sill 11, its intrusion displacement is small.

The maximum intrusion position of the center pillar 9 is a position of a lumbar of an occupant sitting on the seat 5, so that the seat 5 is pushed and moved inward at this position of the lumbar of the occupant (in addition to its above-explained contact with the high-strength area D of the center pillar). As a result, a distance between a head of the occupant and the center pillar 9 (the side wall) is maintained, and thereby the occupant can be protected.

Namely, the high-strength area D of the center pillar 9 that is located at an upper position of the center pillar is received by the load transfer member 25 while a lower portion of the seat 5 is moved inward at the maximum intrusion position of the center pillar 9 (the side wall) toward the vehicle cabin 39.

In addition, the end edge 25c1 that is an outer end of the load transfer member 25 is located nearer to the center pillar 9 that is the side wall of the vehicle body 1 than the seatback frame 19 is. Therefore, when the center pillar 9 (the side wall) receives an impact load by a side impact and is intruded toward the vehicle cabin 39, the center pillar 9 (the side wall) contacts with the load transfer member 25 earlier than with the seatback frame 19. As a result, a direct input of the impact load into the seatback frame 19 is suppressed and deformations of the seatback frame 19 are suppressed.

In addition, in the present embodiment, the side wall that contacts with the load transfer member 25 (and the lower portion of the seat 5) is the center pillar 9 extended vertically. The center pillar 9 is located lateral to the seatback frame 19 in a state where an occupant sits down. By making the strength of the upper area Y of the center pillar 9 higher than the strength of the lower area X thereof, and locating the lower end Da of the high-strength area D lateral to the load transfer member 25, it becomes possible to suppress the intrusion of the side wall toward the vehicle cabin 39.

Note that the load transfer member 25 is sufficient to contact with the center pillar 9 (the side wall) when the center pillar 9 is moved toward the vehicle cabin 39 by a side impact and to suppress the intrusion displacement of the center pillar 9 (the side wall) into the vehicle cabin, and is not needed to have an angled shape composed of the horizontal portion 25a and the inclined portion 25b as shown in FIG. 1.

However, the load transfer member 25 in the present embodiment has an angled shape, and transfers an impact load by the side impact to the center tunnel 3a via the seat frame (the seatback frame 19 and the seat cushion frame 21) while moving the seat 5 inward at the side impact as explained above. The impact load (the kinetic energy of the side impact) transferred to the center tunnel 3a is further transferred to an opposite-side side wall of the vehicle body, and then absorbed by an entire of the vehicle body.

Although the invention has been described above by reference to certain embodiments of the invention, the invention is not limited to the embodiments described above. Scope of the invention should be defined in view of Claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A structure against a side impact, the structure comprising:
    a side wall of a vehicle body, the side wall including a pillar within which a reinforcement is provided;
    a seatback frame; and
    a load receiving member disposed on the seatback frame to contact with the side wall of the vehicle body and to receive an impact load when the side wall of the vehicle body is moved toward a vehicle cabin by a side impact,
    wherein a high-strength area reinforced by the reinforcement to have high strength is formed in the side wall of the vehicle body,
    wherein a lower portion of an upper area of the side wall reinforced by the reinforcement has a strength lower than the strength of the high-strength area is formed beneath the high-strength area,
    wherein a lower area of the side wall that is not reinforced by the reinforcement is formed beneath the upper area,
    wherein a strength of the upper area of the side wall of the vehicle body is made higher, by being reinforced by the reinforcement, than a strength of the lower area of the side wall of the vehicle body, and
    wherein a lower end of the high strength area is located lateral to the load receiving member.

2. The structure against a side impact according to claim 1, wherein an outer end of the load receiving member is located nearer to the side wall of the vehicle body than the seatback frame.

3. The structure against a side impact according to claim 1, wherein the strength of the upper area is made gradually weakened from above to below.

* * * * *